United States Patent [19]
Takashiro

[11] Patent Number: 5,848,346
[45] Date of Patent: Dec. 8, 1998

[54] IMAGE FORMING APPARATUS FOR OFFSETTING OUTPUT SHEET

[75] Inventor: Yuichi Takashiro, Yokohama, Japan

[73] Assignee: Canon Kabushiki Kaisha, Toyko, Japan

[21] Appl. No.: 908,158

[22] Filed: Aug. 7, 1997

Related U.S. Application Data

[63] Continuation of Ser. No. 512,202, Aug. 7, 1995, abandoned.

[30] Foreign Application Priority Data

Aug. 8, 1994 [JP] Japan ..................................... 6-208063

[51] Int. Cl.$^6$ .................................................. G03G 15/00
[52] U.S. Cl. ........................ 399/404; 270/58.31; 399/382
[58] Field of Search ................................... 399/404, 382, 399/405; 270/58.31

[56] References Cited

U.S. PATENT DOCUMENTS

| | | | |
|---|---|---|---|
| 4,811,111 | 3/1989 | Kurokawa | 358/257 |
| 4,866,487 | 9/1989 | Ohuchi et al. | 399/404 |
| 4,905,979 | 3/1990 | Limbach et al. | 271/276 |
| 5,128,762 | 7/1992 | Muramatsu et al. | 355/323 X |
| 5,316,279 | 5/1994 | Corona et al. | 270/1.01 |
| 5,366,212 | 11/1994 | Crowley et al. | 270/58.31 |

*Primary Examiner*—Matthew S. Smith
*Attorney, Agent, or Firm*—Fitzpatrick Cella Harper & Scinto

[57] ABSTRACT

The present invention provides an image forming apparatus comprising convey means for conveying a sheet, image forming means for forming an image on the sheet, and stacking means onto which the sheet is discharged after image formation thereon. Wherein a plurality of jobs each comprising a plurality of sheets on which the images were formed are continuously discharged onto the single stacking means. It further comprises a control device for offsetting an end of a preceding job from an end of a next job when the next job is overlapped with the preceding job after the preceding job was discharged onto the stacking means, on the basis of offset information. Wherein the image forming means records additional information for identifying the job on an offset region of at least a last sheet of the job on the basis of the offset information during image formation regarding the job.

19 Claims, 8 Drawing Sheets

IMAGE FORMING APPARATUS FOR OFFSETTING OUTPUT SHEET

This application is a continuation of application Ser. No. 08/512,202 filed Aug. 7, 1995, which is now abandoned.

BACKGROUND OF THE INVENTION

1. Field of the Invention

The present invention relates to an image forming apparatus in which, among a plurality of jobs discharged into a discharge portion after image formation, a desired job can easily be identified, and more particularly, it relates to an image forming apparatus of composite type having a plurality of functions such as an image treating and forming function (facsimile function) as a facsimile machine, an image treating and forming function (copier function) as a copying machine and an image treating and forming function (printer function) as a printer.

2. Related Background Art

In the past, it is known to use a sorter as a sorting device for an image forming apparatus such as a facsimile machine, a copying machine, a printer and the like. Such a sorter generally has a plurality of bins so that sheets on which images have been formed are discharged into different bins to sort the sheets for each of the jobs (a series of image forming operations which are associated with each other, or a series of sheet bundles obtained by such image forming operations). According to such a sorting operation, the sheets can be sorted by the number corresponding to the number of bins at the most. This means that, in order to sort the sheets by the large number, a large number of bins are required, thereby making the sorter itself and accordingly the entire image forming apparatus bulky.

Another sorting method is of offset type. Unlike to the above-mentioned sorter type which requires a large number of bins, in the offset type, it is possible to sort the sheets merely by using a single discharge tray. That is to say, by offsetting the sheet discharging (or stacking) position regarding the discharge tray for each of the jobs, the plural jobs can be sorted by means of the single discharge tray, thereby separating the jobs from each other.

Now, an example of the sorting method of offset type will be explained with reference to FIG. 8. A discharge tray (discharge portion) 51 shown in FIG. 8 is constituted by a stacking surface 51a for supporting sheets discharged from a discharge direction (shown by the arrow $K_0$), and an abutment portion 51b formed uprightly on the stacking surface 51a to a regulate trail ends of the sheets stacked on the stacking surface 51a. The stacking surface 51a is inclined so that a rear end of the stacking surface on which the abutment portion 51b is formed becomes lower than a front end of the stacking surface. As a result, the discharge sheets are slid down toward the rear end of the stacking surface to abut against the abutment portion 51b, thereby positioning the sheets.

Further, the discharge tray 51 can be shifted to the left (shown by the arrow $K_1$) or right (shown by the arrow $K_2$) toward the discharge direction (shown by the arrow $K_0$) with respect to an image forming apparatus (not shown) so that, whenever the job is finished, the discharge tray is shifted to the direction $K_1$ or $K_2$ alternately. In the example shown in FIG. 8, first of all, prior to the discharge of the job 52, the discharge tray is shifted to the direction $K_2$, and, after the discharge of the job 52 is finished, the discharge tray is shifted to the direction $K_1$. Then, after the discharge of the job 53, the discharge tray is shifted to the direction $K_2$. Similarly, after the discharge of the job 54 is finished, the discharge tray is shifted to the direction $K_1$, and, after the discharge of the job 55 is finished, the discharge tray is shifted to the direction $K_2$.

By doing so, left ends or right ends of the respective jobs are protruded by a predetermined amount. When it is assumed that the protruded portions are offset regions R, the offset regions R are formed at the left and right ends of the jobs alternately when the discharge tray 51 is shifted the direction $K_1$ and the direction $K_2$ alternately. In this way, the plurality of jobs 52–55 can be sorted by the single discharge tray, thereby separating the jobs from each other.

By the way, for example, regarding the facsimile function, upon reception, additional information A such as sender's name, receiver's name, data/hour and the like is recorded on the tip end portions of the sheets in each job, as shown in FIG. 8. As mentioned above, since the sheets are positioned by abutting the trail ends of the sheets against the abutment portion 51b, if lengths (in the discharge direction) of the sheets are the same, the tipe ends portions of the sheets are aligned vertically, with the result that the additional information A recorded on each sheet will be covered by the next sheet to conceal the information. Accordingly, it is impossible to easily identify or discriminate a desired job among the plurality of jobs.

SUMMARY OF THE INVENTION

An object of the present invention is to provide an image forming apparatus in which, among a plurality of jobs discharged onto a single discharge portion (stacking means; discharge tray), a desired job can easily be identified.

To achieve the above object, according to the present invention, there is provided an image forming apparatus comprising convey means for conveying a sheet to be subjected to image formation, image forming means for forming an image on the sheet, and discharge stacking means onto which the sheet on which the image was formed is discharged, and wherein a plurality of jobs each comprising a plurality of sheets on which the images were formed are continuously discharged onto the discharge stacking means.

It further comprises an offset control device for offsetting an end of a preceding job from an end of a next job when the next job is overlapped with the preceding job after the preceding job was discharged onto the discharge stacking means on the basis of offset information. Wherein the image forming means records additional information for identifying the job on an offset region of at least a last sheet of the job on the basis of the offset information when the image formation is effected regarding the job.

In this case, a shifting mechanism acting as the offset control device can be operated in the following two manners, for example. In the first manner, first of all, prior to the discharge of the preceding job, the shifting mechanism is operated so that the discharge stacking means is shifted or offset to the left or right, and, after the discharge of the preceding job is finished, prior to the discharge of the next job, by shifting the discharge stacking means to right or left, repeating or alternate offset operations are effected to that the offset regions of the jobs are formed at the left and right portions of the jobs alternately as the jobs are discharged.

In the second manner, prior to discharge of the preceding job, the shifting mechanism is operated so that the discharge stacking means is shifted or offset to the left or right, and, after the discharge of the preceding job is finished, prior to the discharge of the next job, by further shifting the discharge stacking means to left or right, continuous offset operations are effected so that the offset regions of the jobs are continuously formed at one of the left and right portions of the jobs as the jobs are discharged. In the above-mentioned second manner, after the shifting mechanism effects the continuous offset operations regarding a predetermined number of jobs, the offset direction of the discharge stacking means may be changed, and then, the continuous offset operations may be restarted.

Regarding the additional information, the additional information for each job may be a portion of the image recorded on each sheet of the respective job or may be one obtained by contracting a portion of the image or the entire image recorded on each sheet of the respective job. Further, the additional information may be recorded on a predetermined sheet of each job, and this sheet may be discharged on the last sheet of this job to appear the information.

The image forming apparatus may have at least a facsimile function, and, upon reception in the facsimile, the additional information may be at least one of the sender's name, receiver's name and date/ hour. Alternatively, the image forming apparatus may have a plurality functions such as a facsimile function, a copier function and the like, and the additional information may include a mark for discriminating one of the functions from which the job is outputted.

According to the above-mentioned arrangement, for example, a first job is discharged onto the discharge stacking means. Then, after the discharge stacking means is offset to the left (or right) toward the sheet discharge direction, a second job is discharged. As a result, although the second job is overlapped on the first job, since the first job is already offset to the left (or right) together with the discharge stacking means, a left (or right) end of the second job is positioned inwardly from a left (or right) end of the first job. That is to say, the offset region protruded from the left (or right) end from the second job is formed at the left (or right) end portion of the first job. In this regard, the fact that the offset region is formed at the left end portion or the right end portion of the first job is merely determined by offsetting the discharge stacking means to the left or right, respectively, prior to the discharge of the second job. Accordingly, so long as the direction toward which the discharge stacking means is offset after the discharge of the first job is previously determined to the left (or right), the offset region is formed at the left (or right) end portion of the first job after the discharge of the second job.

In effect, on the basis of the previous operating condition of the shifting mechanism and the present position of the discharge stacking means, the left or right offset direction for the next job which is to be subjected to image formation is judged by the control device as the offset information, so that the additional information is recorded on the left end portion of the job (if the offset direction is left) or on the right end portion of the job (if the offset direction is right) during the image formation. By doing so, the offset region is always formed at the end portion of the job on which the additional information was recorded during the image formation.

By the way, since the offset region is the protruded area protruded leftward or rightward, the additional information recorded on the offset region can easily be ascertained. Accordingly, a desired job can easily discriminated from the other jobs. Incidentally, although the additional information may be recorded on all of the sheets in each job, it is sufficient that the additional information is recorded on at least the last sheet or uppermost sheet of each job. When the shifting mechanism performs the alternate offset operations, the offset regions are formed alternately at the left ends and the right ends of the jobs discharged onto the discharge stacking means. Accordingly, in correspondence to the above, the additional information may be recorded alternately on the left end portions and the right end portions of the jobs. When the shifting mechanism performs the continuous offset operations, the offset regions are continuously formed at one of the left and right ends of the predetermined number of jobs. Accordingly, in correspondence to the above, the additional information may be recorded continuously on the left end portions or the right end portions of the predetermined number of jobs.

Incidentally, the continuous offset operations are effected for the predetermined number of jobs. Thereafter, the offset direction of the discharge stacking means may be changed. In correspondence to this, the additional information may be recorded continuously on the left end portions or the right end portions of the predetermined number of jobs, and then may be recorded continuously on the other end portions of the succeeding jobs.

As mentioned above, according to the present invention, by recording the additional information (for identifying each job) on the offset regions of the respective jobs protruded leftward or rightward from the other jobs, each job can easily be discriminated from the other jobs. Therefore, each job can easily be identified without using a large number of discharge portions.

DETAILED DESCRIPTION OF THE PREFERRED EMBODIMENTS

The present invention will now be explained in connection with embodiments thereof with reference to the accompanying drawings.

(First Embodiment)

Figure 1:
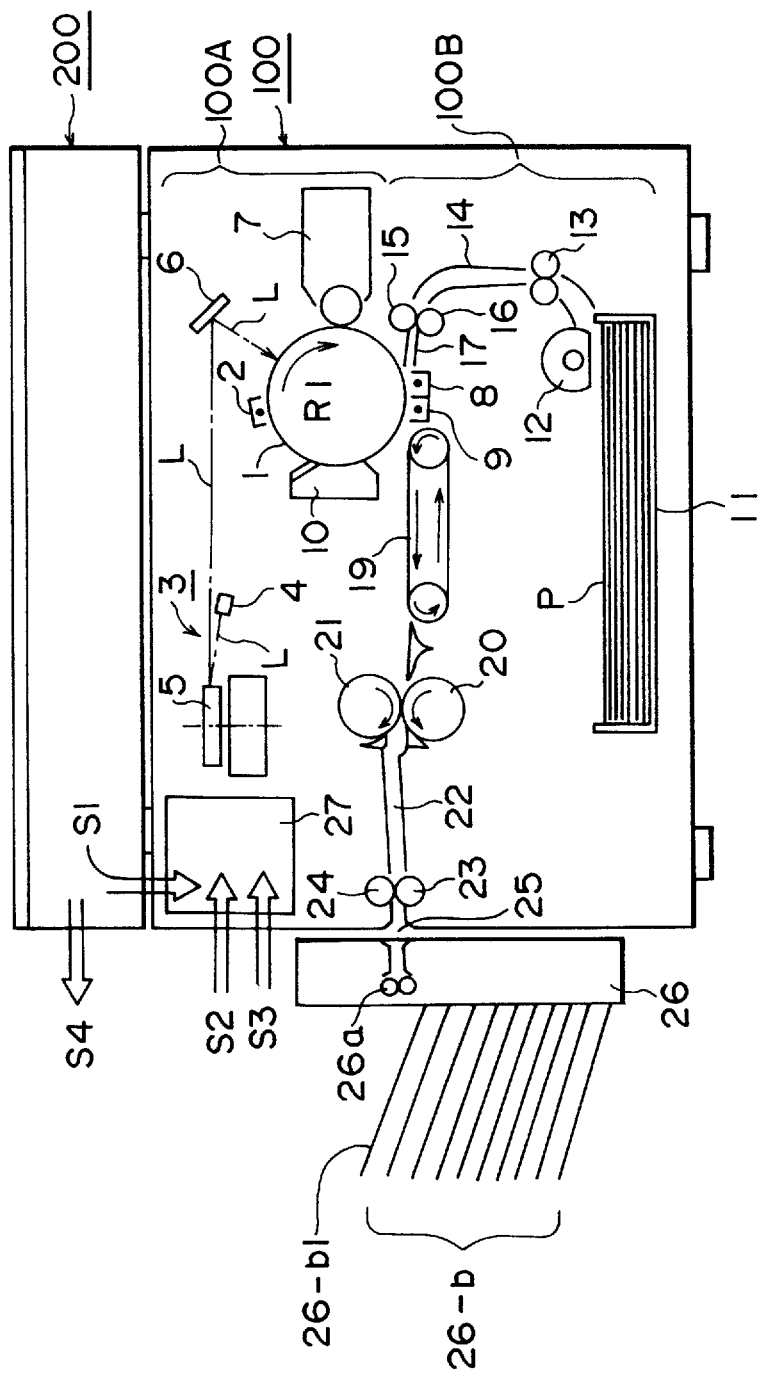
FIG. 1 is a schematic elevational section view of an image forming apparatus according to a first embodiment of the present invention.

FIG. 1 shows a schematic construction of an image forming apparatus according to a first embodiment of the present invention. The image forming apparatus shown in FIG. 1 is of so-called composite type having a facsimile function, a copier function and a printer function. Image forming operations regarding these functions are effected by a single image forming means and output sheets (or jobs) are discharged onto a single discharge portion.

Now, a construction and an operation of the image forming apparatus shown in FIG. 1 will be briefly described The image forming apparatus shown in FIG. 1 is an electrophotographic image forming system of laser scan exposure/transfer type which includes a body of an image forming apparatus (referred to as "image forming portion" hereinafter) 100 having an image forming means 100A and a convey means 100B, and an image reading apparatus (scanner) 200 rested on the image forming portion 100.

The image forming means 100A includes a drum-shaped electrophotographic photosensitive member (referred to as "photosensitive drum" hereinafter) 1 which is rotated by a drive means (not shown) at a predetermined peripheral speed (process speed) in a direction shown by the arrow R1. A surface of the photosensitive drum 1 is uniformly charged by a first charger 2 with predetermined polarity and potential and then is exposed by a laser scanner 3. Time-lapse electric digital pixel signals corresponding to aimed image information are sent from a controller 27 (described later) to a laser generator 4 of the laser scanner 3, which laser generator 4 emits a laser beam L modulated in accordance with the signals. The laser beam is illuminated onto the surface of the photosensitive drum 1 through a rotatable mirror (polygon mirror) 5 and a reflection mirror 6 to scan and expose the photosensitive drum, thereby forming a latent image on the drum. The latent image is developed with toner from a developing device 7 to form a toner image.

On the other hand, sheets P in a sheet supply cassette 11 are separated one by one by a pick-up roller 12, and the separated sheet is sent to a transfer portion between the photosensitive drum 1 and a transfer charger 8 at a predetermined timing through a pair of convey rollers 13, a sheet path 14, a pair of regist rollers 15, 16 and a sheet path 17. At the transfer portion, the toner images on the photosensitive drum 1 are successively transferred onto the sheet P.

The sheet P to which the images were transferred is separated from the surface of the photosensitive drum 1 by a separation charger 9, and the separated sheet is sent, by a convey device 19, to a nip (fixing nip) between a pair of fixing rollers 20, 21, where the toner images are fixed to the sheet with heat and pressure from the fixing rollers 20, 21. Thereafter, the sheet is discharged into a sorting device (discharge portion) 26 disposed out of the image forming portion through a discharge opening 25 via a sheet path 22 and a pair of discharge rollers 23, 24. Incidentally, as will be described later, the discharged sheet may be introduced into one of sorter bins 28-1, 28-2, 28-3 through a path PH1 or PH2 and a flapper F1 or F2.

On the other hand, after the toner images were transferred to the sheet P, the residual toner and other foreign matters remaining on the surface of the photosensitive drum 1 are removed by a cleaning device 10 for preparation for the next image formation.

Next, the copier function, printer function and facsimile function will be explained.

In the copier function, the scanner 200 is connected to the image forming portion 100 so that image information on an original to be copied is read by the scanner 200, and the image signal from the scanner is sent to the controller 27 of the image forming portion 100 as a copy image signal S1, with the result that the image treating and forming operation is effected in a copier mode and the copied sheets are discharged into the sorting device 26. Incidentally, bin trays 26-b can be lifted and lowered, and an uppermost bin tray 26-b1 can also be used as a non-sort tray. Further, the bin trays can be shifted in a widthwise direction so that the sheets can be offset. The reference numeral 26a denotes discharging rollers.

In the printer function, a host device (not shown) such as a computer is connected to the image forming portion 100 so that a print image signal S2 corresponding to an aimed character, figure and the like is sent from the host device to the controller 27 of the image forming portion 100, with the result that the image treating and forming operation is effected in a printer mode and the printed sheets are discharged into the sorting device 26.

In the facsimile function, a communication circuit (not shown) is connected to the image forming portion 100 so that a reception image signal S3 from sent from the other party is sent to the controller 27 of the image forming portion 100, with the result that the image treating and forming operation is effected in a facsimile mode and the receiver sheets are discharged into the sorting device 26. In the facsimile function, when the image information is sent from this party to the other party, the image information on the original to be sent is read by the scanner 200, and the read image signal is sent to the other party through the communication circuit as a facsimile transmission image signal S4.

As mentioned above, by connecting the scanner 200, the host device (such as computer) or the communication circuit to the image forming portion 100, the image forming apparatus can be selectively used as a copier, a printer or a facsimile machine.

Figure 2:
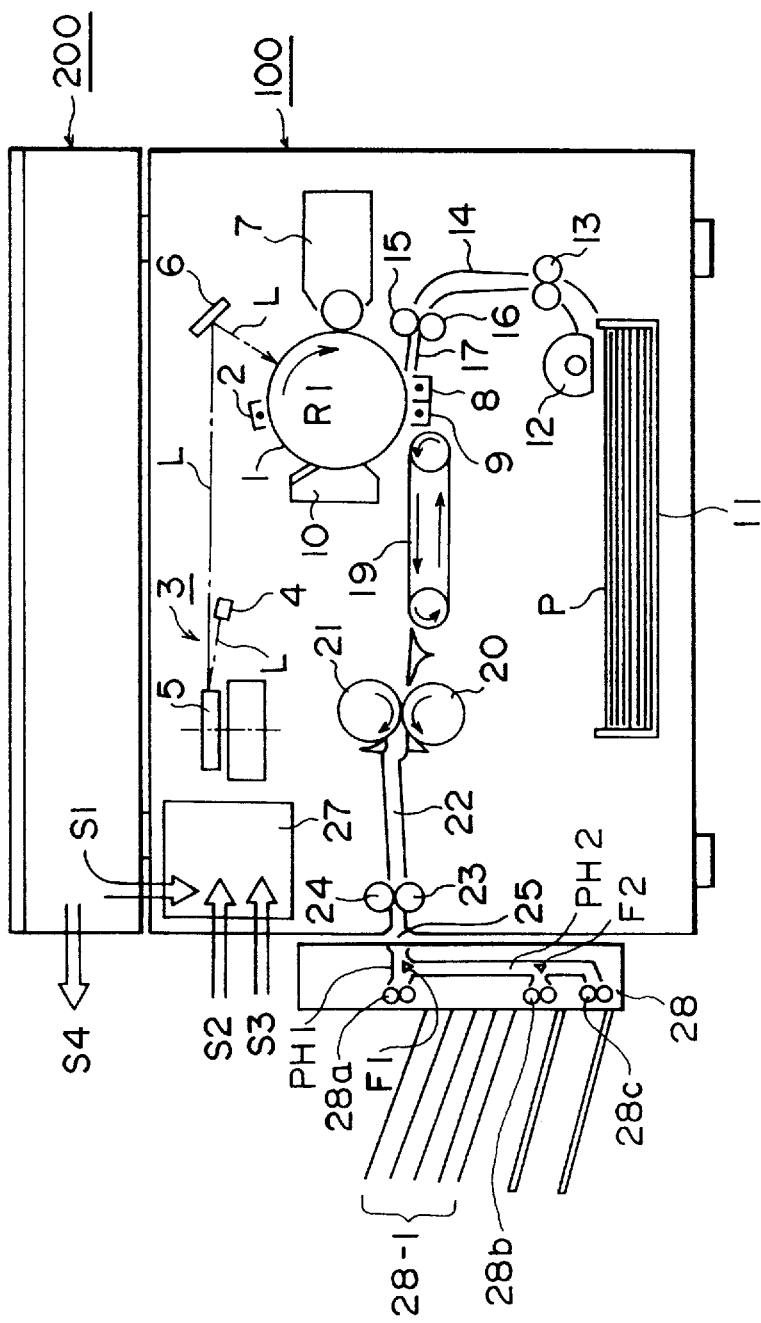
FIG. 2 is a schematic elevational sectional view of an image forming apparatus according to an alteration of the first embodiment.

An image forming apparatus shown in FIG. 2 has a sorting device 28 different from the sorting device 26 of FIG. 1 (the other portions are the same as those shown in FIG. 1). The sorting device 28 includes a copier sorter 28-1 having a plurality of bin trays, a single facsimile discharge tray 28-2, and a single printer tray 28-3. Incidentally, the bin trays 28-1 can be lifted to be opposed to a pair of discharging rollers 28a, the discharge tray 28-2 is opposed to a pair of discharging rollers 28b, and the tray 28-3 is opposed to a pair of discharging rollers 28c. The uppermost bin tray among the bin trays 28-1 can also be shifted in the widthwise direction as is in FIG. 1.

Figure 3:
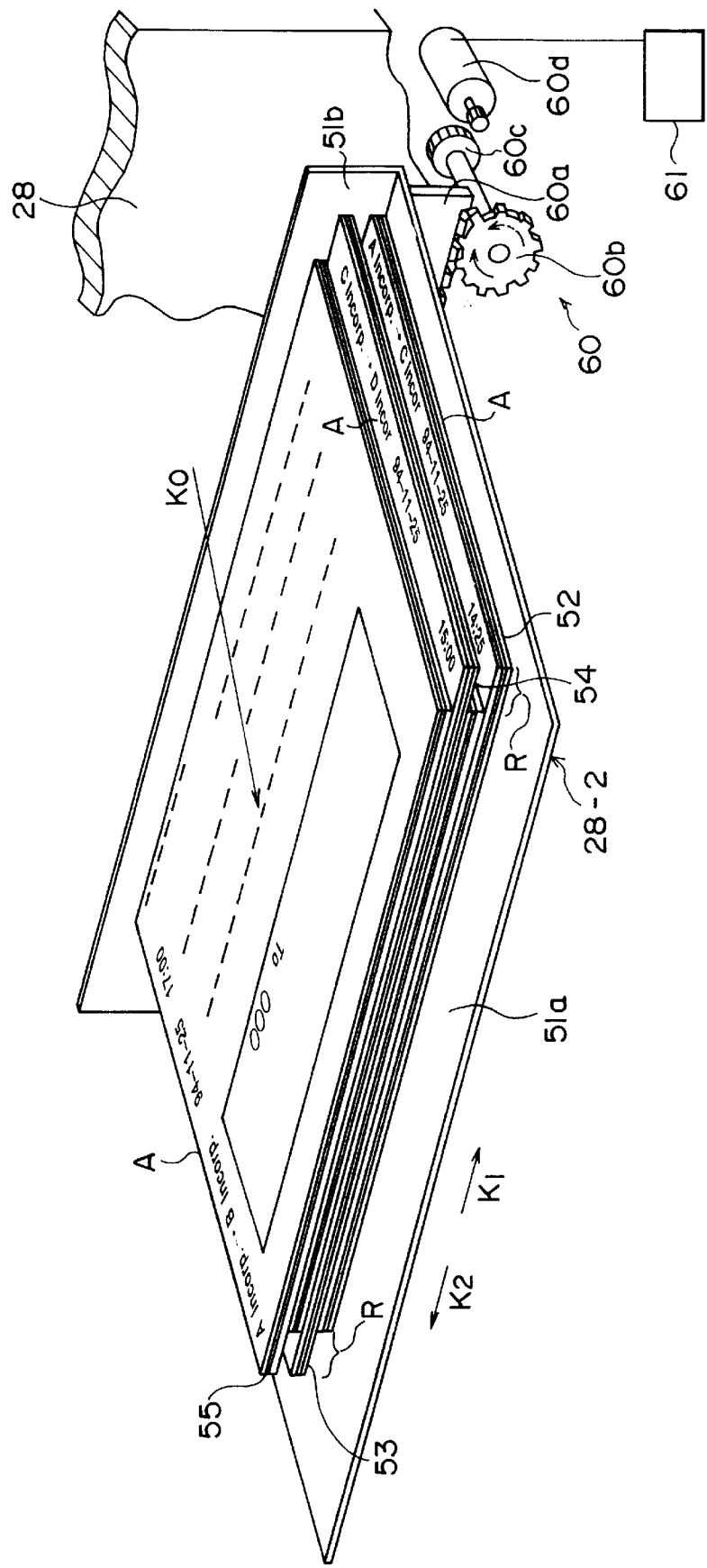
FIG. 3 is a perspective view showing offset regions and offset information of jobs, according to the first embodiment.

FIG. 3 is a perspective view of the facsimile discharge tray (discharge portion) 28-2. The discharge tray 28-2 is attached to the sorting device 28 directly or via an appropriate member (not shown) so that the tray can be shifted in a left-and-right direction with respect to the sorting device 28. Incidentally, the left-and-right direction is referred to with respect to a sheet discharge direction (shown by the arrow $K_0$). Thus, a direction shown by the arrow $K_1$ is a "left" direction and a direction shown by the arrow $K_2$ is a "right" direction. Incidentally, the uppermost bin tray shown in FIG. 1 has the same construction as the tray 28-2.

The discharge tray 28-2 has a stacking surface 51a for supporting the discharged sheets, and an abutment portion 51b for regulating positions of trail ends of the sheets rested on the stacking surface 51a. The stacking surface 51a is inclined so that a rear end of the stacking surface on which the abutment portion 51b is formed becomes lower than a front end of the stacking surface. As a result, the sheet discharged (toward the direction $K_0$) onto the stacking surface 51a or onto the sheets stacked on the stacking surface 51a is slid down toward along the inclination of the stacking surface 51a to abut against the abutment portion 51b, thereby positioning the sheet in the lengthwise direction (front-and-rear direction).

The discharge tray 28-2 is connected to a shifting mechanism 60 so that the tray can be shifted in the left-and-right direction by the shifting mechanism. Incidentally, the shifting mechanism may comprise a rack 60a formed integrally formed with the discharge tray 28-2, and a pinion 60b meshed with the rack, or may comprise a belt integrally connected to the discharge tray 28-2, and pulleys for driving the belt. However, the shifting mechanism is not limited to such examples, so long as the discharge tray can be shifted in the left-and-right direction effectively by the shifting mechanism. In FIG. 3, the reference numeral 60d denotes a reversible motor; and 60c denotes a gear supported together with the pinion 60b by the sorting device 28.

The movement of the shifting mechanism 60 is regulated or controlled by a control device 61. In the illustrated embodiment, the control device 61 controls the motor 60d so that, whenever the jobs 52, 53, 54, 55 are discharged, the discharge tray is shifted to the left and right alternately, thereby positioning the jobs 52–55 in the left-and-right direction. That is to say, after the job 52 was discharged onto the discharge tray 28-2, the discharge tray 28-2 is shifted in the direction $K_1$ by a predetermined amount. Then, the job 53 is discharged. After the job 53 was discharge tray, the discharge tray 28-2 is shifted in the direction $K_2$ by a predetermined amount. Similarly, after the job 54 was discharged, the discharge tray 28-2 is shifted in the direction $K_1$, and, after the job 55 was discharged, the discharge tray 28-2 is shifted in the direction $K_2$. In this way, by shifting the discharge tray 28-2 in the direction $K_1$ after one job is discharged and by shifting the discharge tray 28-2 in the direction $K_2$ after the next job is discharged, the offset regions R are successively formed at the left or right end portions of the respective jobs, which offset region protrudes from the end of the succeeding job.

The position of the offset region R of each jobs 52–55 is merely determined by the direction toward which the discharge tray is shifted immediately after the job is discharged. That is to say, when the discharge tray 28-2 is shifted to the left (direction $K_1$), the offset region R is formed at the left end portion of the job (for example, jobs 52, 54); whereas, when the discharge tray is shifted to the right (direction $K_2$), the offset region R is formed at the right end portion of the job (for example, jobs 53, 55). Accordingly, when the discharge tray 28-2 is shifted to the left and right alternately whenever the jobs 52–55 are discharged as mentioned above, as shown in FIG. 3, the offset regions R are formed at the left and right end portions of the jobs 52–55 alternately.

When information regarding the shifting direction of the discharge tray 28-2 on the basis of the control device 61 is used as the offset information, the image forming means 100A records additional information A for identifying the job on the offset regions R of the jobs 52–55 on the basis of the offset information. Since these offset regions R are not covered by the next job, the additional information A recorded on the offset region R can easily be ascertained, thereby discriminating a desired job from the other jobs, i.e. identifying the desired job. Accordingly, the job can be identified without using a number of discharge trays (or bins).

According to the present invention, since the additional information A is recorded on one end portion of each job during the image formation and the discharge tray 28-2 is shifted toward the end portion on which the additional information A was recorded after the job was discharged, the offset region R can be formed at the end portion on which the additional information A was recorded. Accordingly, when the offset region R is formed at the left end or right end of the job, i.e., when the discharge tray 28-2 is shifted to the left or right, the additional information A is recorded on the left or right end portion of the job.

On the basis of the offset information regarding the shifting direction of the discharge tray, the end portion of the job on which the additional information A is to be recorded is determined. As mentioned above, the offset information provides data regarding the shifting direction of the discharge tray 28-2 after the job on which the additional information A is to be recorded is discharged onto the discharge tray.

For example, the offset information can be determined in the following manner. As is in the illustrated embodiment, in the case where the discharge tray 28-2 is shifted to the left and right alternately, the offset information is selected so that, when the discharge tray is shifted to the left (or right) after the preceding job was discharged, after the succeeding job is discharged, the discharge tray is shifted to the right (or left) to form the offset region R at the right (or left) end portion of the succeeding job. On the basis of such offset information, the additional information can be recorded on the right (or left) end portion of the succeeding job during the image formation regarding the succeeding job. In the example shown in FIG. 3, since the facsimile mode is selected, the additional information A is actual size sender's name, receiver's name and/or date/hour, and is controlled by the facsimile reception image signal S3 and the controller 27. Incidentally, unlike to the normal mode (no offset), the additional information is outputted after top-bottom inversion of 90 degrees so that the additional information is recorded along the discharge direction, as shown in FIG. 3. Normally, the additional information is recorded along a direction intersecting with the discharge direction.

In the case where the discharge tray 28-2 is not shifted to the left and right alternately, the offset information is determined by the control device on the basis of the shifting direction of the discharge tray after the discharge of the preceding job and the present position of the discharge tray 28-2. This is effective, for example, when the offset direction is changed after the continuous offset operations for continuously forming the offset regions R at one ends of the predetermined number of jobs.

Incidentally, it is not necessary that the additional information is recorded on all of the sheet in each job. The additional information may be recorded on at least uppermost sheet of each job.

(Second Embodiment)

Figure 4:
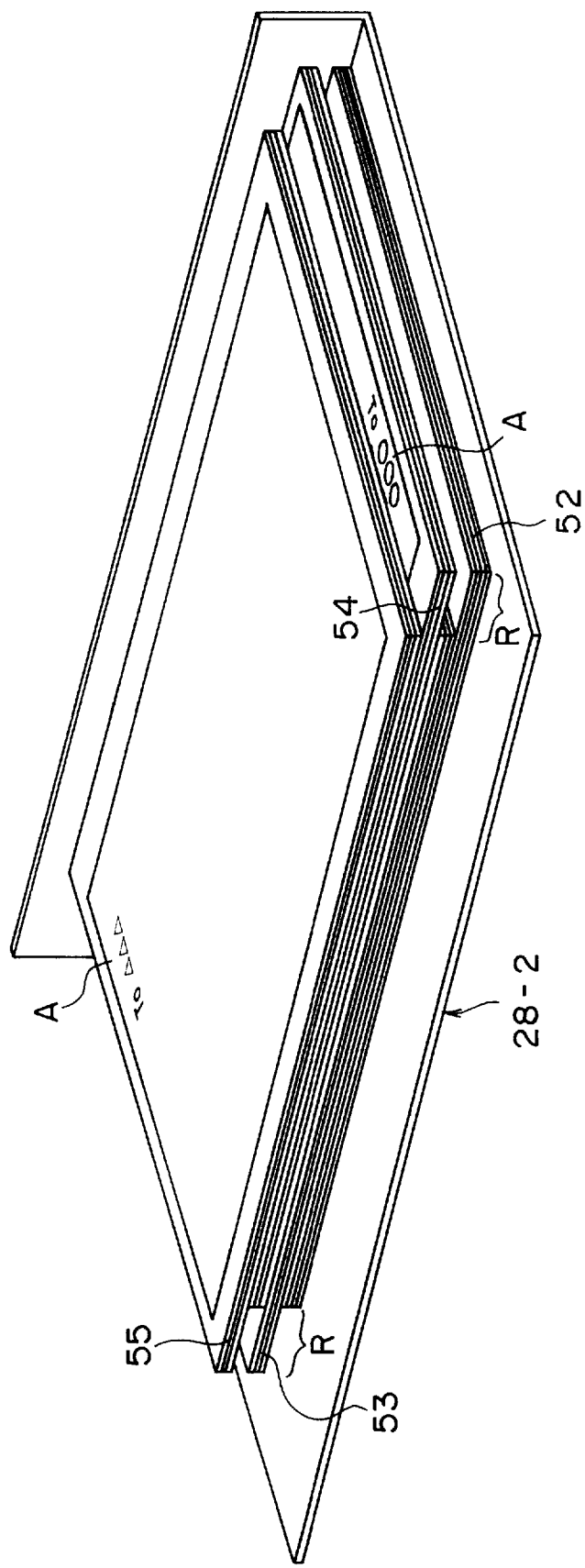
FIG. 4 is a perspective view showing offset regions and offset information of jobs, according to a second embodiment of the present invention.

FIG. 4 shows a second embodiment of the present invention, in which a predetermined portion of the image on the last sheet or any sheet in each job is recorded on the offset region with actual size. This recording is effected under the control of the controller 27. Incidentally, in the illustrated embodiment, although the additional information is recorded on an additional sheet other than the sheets in the job, it should be noted that the additional information may be recorded on the offset region of the last or uppermost sheet in the job. In the illustrated embodiment, the above-mentioned "predetermined portion of the image" is an address of the receiver. Further, it is preferable that the additional information is recorded on the additional sheet particularly when the additional information should not be recorded on the sheet in the job.

Figure 5:
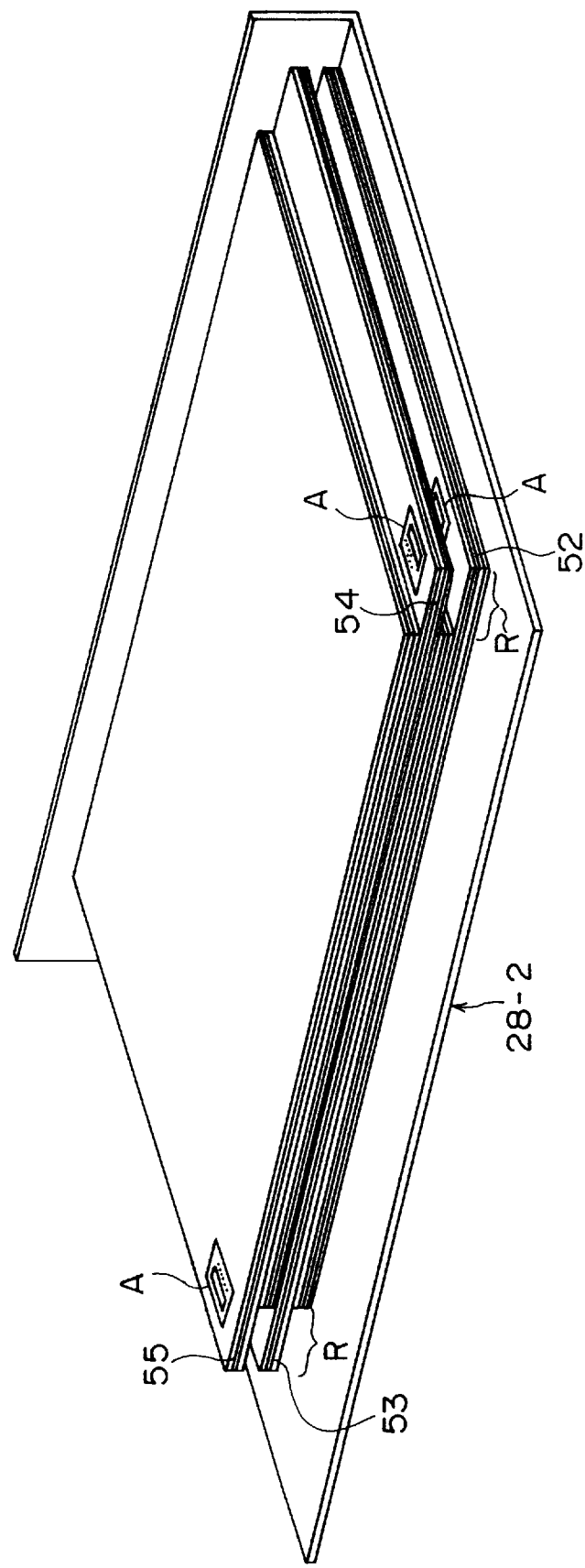
FIG. 5 is a perspective view showing offset regions and offset information of jobs, according to a third embodiment of the present invention.

FIG. 5 shows a third embodiment of the present invention. In this third embodiment, the entire or part of the image on the last sheet or any sheet in each job is contracted or reduced, and the contracted or reduced image is recorded on the offset region as the additional information A. Such a treatment is effected under region as the additional information A. Such a treatment is effected under the control of the controller 27. Incidentally, also in this third embodiment, as is in the second embodiment, the additional information is recorded on an additional sheet other than the sheets in the job, it should be noted that the additional information may be recorded on the offset region R of the last sheet in the job. Further, this embodiment can also be applied to the printer mode. In this case, the similar treatment is effected with respect to the sheets discharged onto the printer discharge tray 28-3 of FIG. 2.

(Fourth Embodiment)

Figure 6:
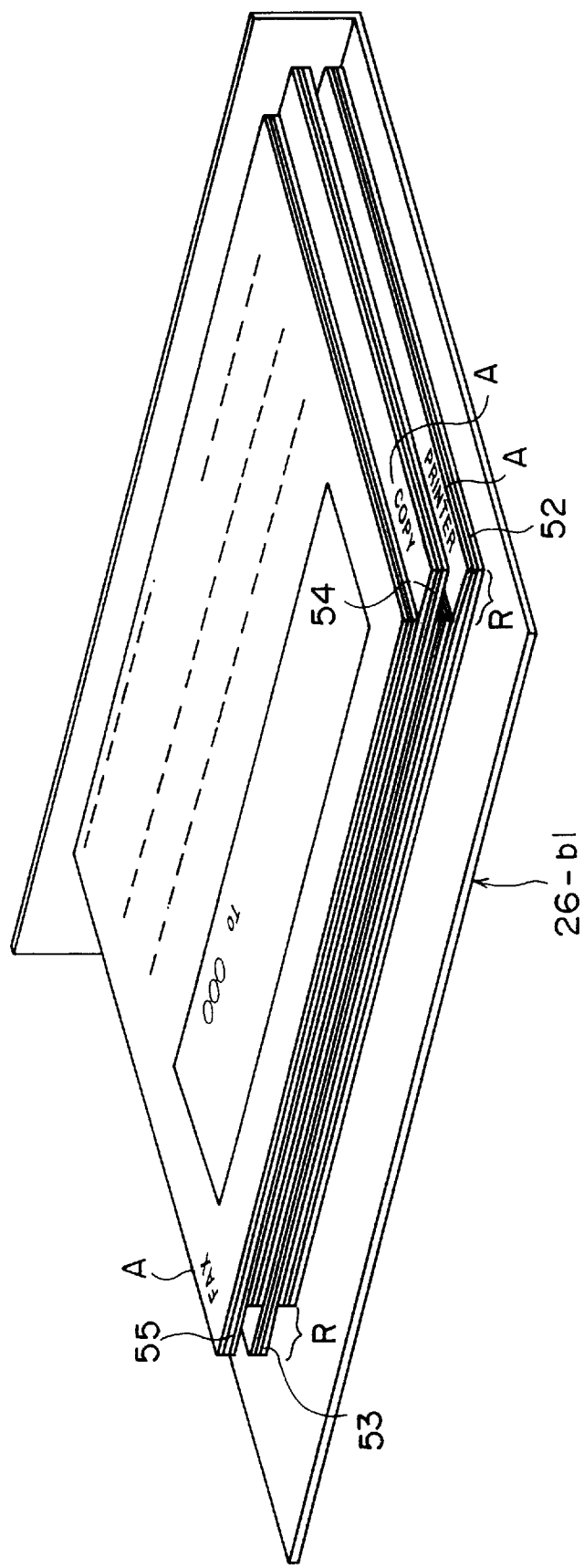
FIG. 6 is a perspective view showing offset regions and offset information of jobs, according to a fourth embodiment of the present invention.
Figure 7:
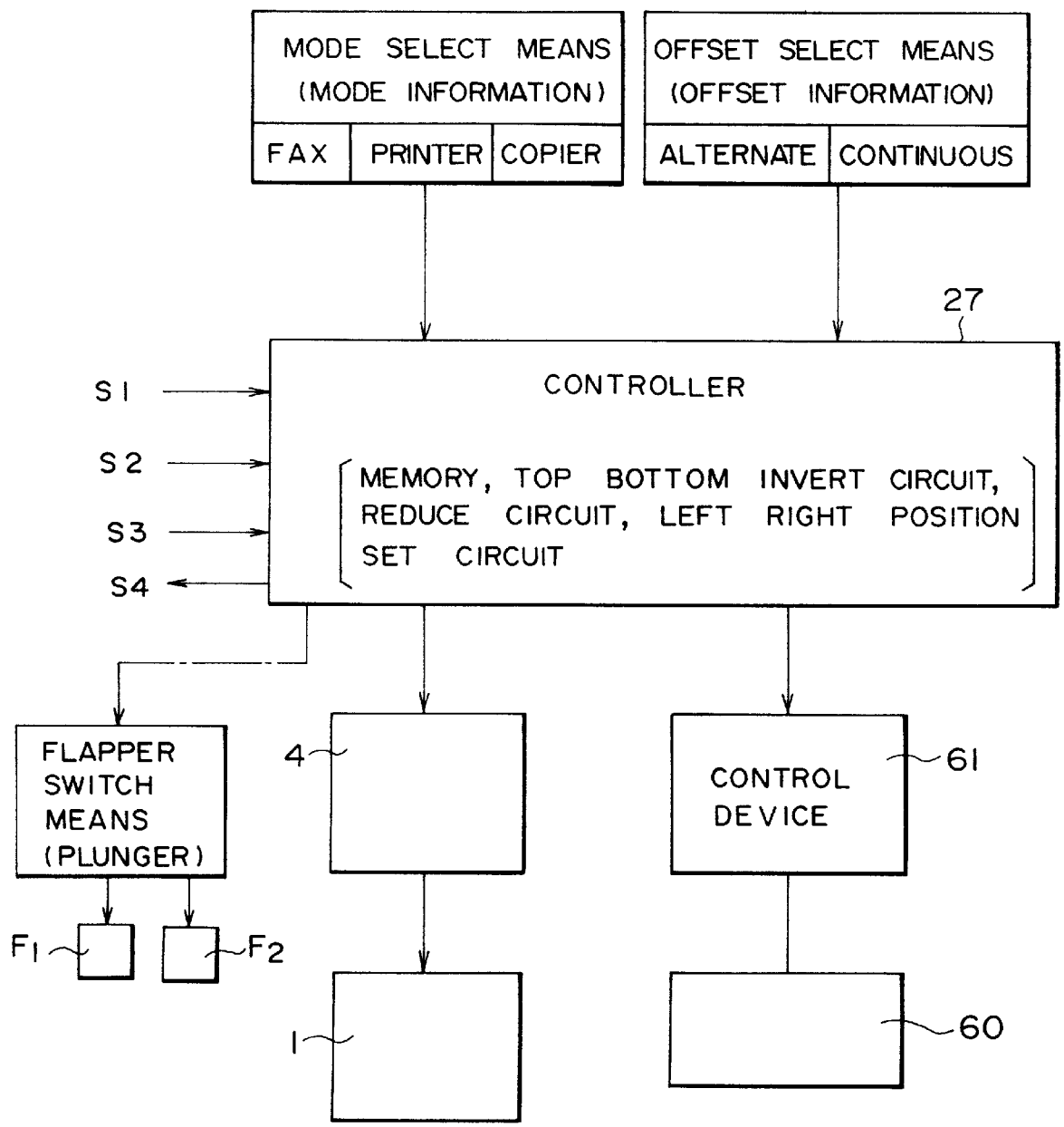
FIG. 7 is a control block diagram according to the present invention.
Figure 8:
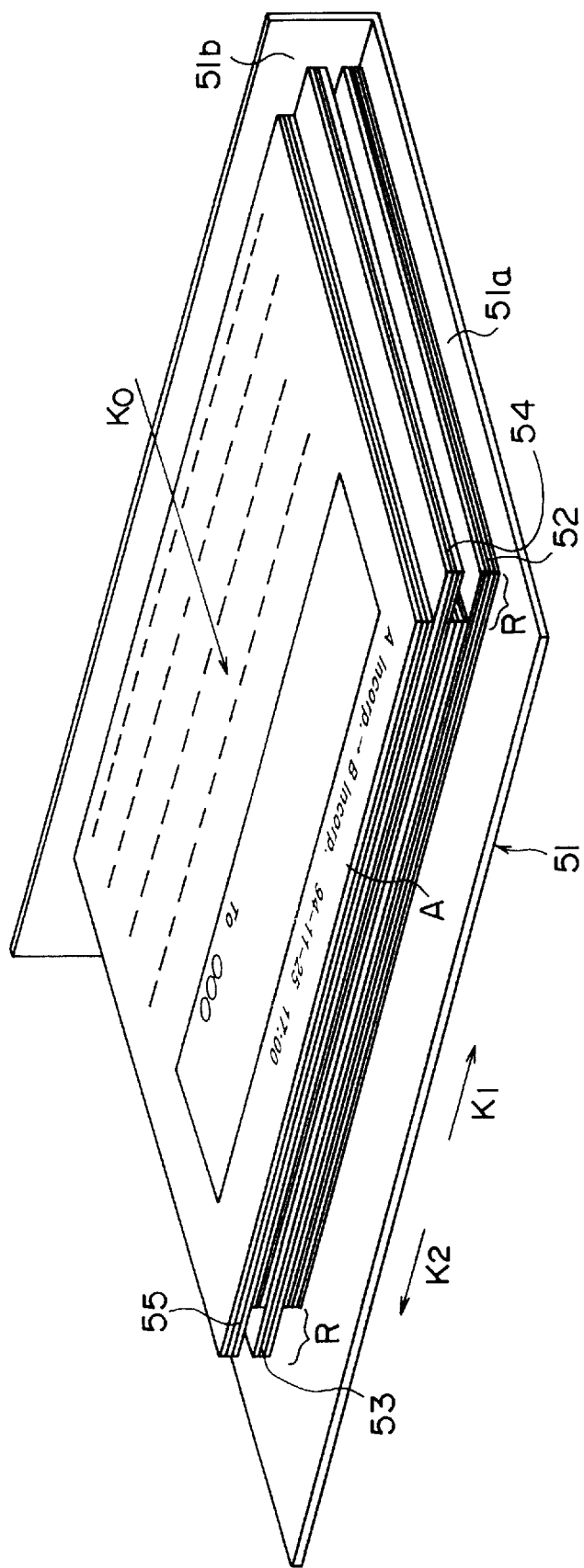
FIG. 8 is a perspective view showing offset regions and offset information of jobs in a conventional technique.

FIG. 6 shows a fourth embodiment of the present invention. In this fourth embodiment, the respective discharge trays for the copier function, printer function and facsimile function are not provided. That is to say, the jobs obtained by the plural functions are discharged onto the uppermost tray 26-b1 shown in FIG. 1 and are sorted from each other.

For example, as shown in FIG. 6, as the additional information, an identifying mark "FAX" is recorded on the job 55 obtained by the facsimile function, an identifying mark "COPY" is recorded on the job 54 obtained by the copier function and an identifying mark "PRINTER" is recorded on the job 52 obtained by the printer function, thereby identifying the jobs from each other. To this end, the additional information selected on the basis of the kind of the function is stored in the memory of the controller 27.

When the image forming apparatus has the facsimile function and the sender's name, receiver's name and date/hour are recorded as the additional information, the jobs obtained by the facsimile function can easily be discriminated from the jobs obtained by the other function such as the copier function and printer function.

What is claimed is:

1. An image forming apparatus, comprising:

conveying means for conveying a sheet;

image forming means for forming an image on the sheet;

stacking means onto which the sheet is discharged and stacked after image formation thereon, wherein a plurality of jobs each comprising a plurality of sheets on which the images are formed are discharged onto said stacking means; and a control device for offsetting an end of the sheets of a preceding job from an end of the sheets of a next job based on offset information so that the plurality of jobs are offset along a direction intersecting with a sheet discharge direction, the offset being obtained by shifting and stacking the plurality of jobs alternately and oppositely in the direction intersecting with the sheet discharge direction, for each job;

said image forming means, during image formation, recording additional information for identifying each job on a region of at least a last sheet of each job projected by the offsetting, wherein the region is located alternately opposite for each job, and the additional information is oriented in the sheet discharge direction.

2. An image forming apparatus according to claim 1, wherein the offset is effected by shifting said stacking means to the left or right.

3. An image forming apparatus according to claim 2 wherein said control device performs offset operations in which, after the discharge of the preceding job is finished and prior to the discharge of the next job, by shifting said stacking means to right or left, so that the offset regions of the jobs are formed at the left and right end portions of the jobs alternately as the jobs are discharged.

4. An image forming apparatus according to one of claims 1,2 and 3, wherein the additional information for each job is a part of the image recorded on the sheet in each job.

5. An image forming apparatus according to one of claims 1,2 and 3, wherein the additional information for each job comprises one obtained by reducing the entire or part of the image recorded on the sheet in each job.

6. An image forming apparatus according to one of claims 1,2 and 3, wherein said image forming means has a facsimile function, a copier function and other function (s), and the additional information is a mark for identifying the jobs obtained by one of these functions from the jobs obtained by the other functions.

7. An image forming apparatus according to one of claims 1,2 and 3, wherein said image forming means has at least a facsimile function, and the additional information in the reception includes at least one of sender's name, receiver's name and date/hour.

8. An image forming apparatus according to one of claims 1,2 and 3, wherein an additional sheet on which the additional information for each job is recorded is discharged as a last sheet for each job.

9. An image forming apparatus according to claim 1, wherein the image is recorded perpendicular the sheet discharge direction, and the additional information is recorded parallel to the sheet discharge direction.

10. An image forming apparatus according to claim 9, wherein the offset is effected by shifting said stacking means to the left or to the right, alternately.

11. An image forming apparatus, comprising:

conveying means for conveying a sheet;

image forming means for forming an image on the sheet;

stacking means onto which the sheet is discharged and stacked after image formation thereon, wherein a plurality of jobs each comprising a plurality of sheets on which the images are formed are discharged onto said stacking means; and a control device for offsetting an end of the sheets of a preceding job from an end of the sheets of a next job based on offset information so that the plurality of jobs are offset along a direction intersecting with a sheet discharge direction, said image forming means, during image formation, recording additional information for identifying each job on a region of at least a last sheet of each job projected by the offsetting, which region extends on such last sheet along the sheet discharge direction, wherein the additional information for each job comprises information obtained by reducing a part of or entire image recorded on the sheet in each job.

12. An image forming apparatus, comprising:

conveying means for conveying a sheet;

image forming means for forming an image on the sheet;

stacking mean onto which the sheet is discharged and stacked after image formation thereon, wherein a plurality of jobs each comprising a plurality of sheets on which the images are formed are discharged onto said stacking means; and a control device for offsetting an end of the sheets of a preceding job from an end of the sheets of a next job based on offset information so that the plurality of jobs are offset along a direction intersecting with a sheet discharge direction, said image forming means, during image formation, recording additional information for identifying each job on a region of at least a last sheet of each job projected by the offsetting, which region extends on such last sheet along the sheet discharge direction, wherein said image forming means has at least a facsimile function and a copier function, and wherein the additional information is a mark for distinguishing the jobs obtained by one of these functions from the jobs obtained by the other function.

13. An image forming apparatus according to claim 11 or 12, wherein the offset is effected by shifting said stacking means to the left or right.

14. An image forming apparatus according to claim 13, wherein said control device performs the offset operations in which, prior to the discharge of the preceding job, said stacking means is offset to the left or right, and after the discharge of the preceding job is finished, prior to the discharge of the next job, by shifting said stacking means to right or left, so that the offset regions of the job are formed at the left and right end portions of the jobs alternately as the jobs are discharged.

15. An image forming apparatus according to claim 13, wherein said control device performs the offset operations in which, prior to the discharge of the preceding job, said stacking means is offset to the left or right, and after the discharge of the preceding job is finished, prior to the discharge of the next job, by shifting said stacking means to the same direction, so that the offset regions of the jobs are continuously formed at one of the left and right portions of the jobs as the jobs are discharged.

16. An image forming apparatus according to claim 11 or 12, wherein the image is recorded perpendicular to the sheet discharge direction, and the additional information is recorded parallel to the sheet discharge direction.

17. An image forming apparatus according to claim 11 or 12, wherein said plurality of jobs are offset staggeredly and alternately.

18. An image forming apparatus according to claim 17, wherein the offset is effected by shifting said stacking means to the left or to the right, alternately.

19. An image forming apparatus according to claim 11 or 12, wherein said control device performs continuous offset operations so that the offset regions are continuously formed at one of the left and right portions of the jobs as the jobs are discharged.

* * * * *

UNITED STATES PATENT AND TRADEMARK OFFICE
CERTIFICATE OF CORRECTION

PATENT NO. : 5,848,346

DATED : December 8, 1998

INVENTOR(S) : YUICHI TAKASHIRO

It is certified that error appears in the above-identified patent and that said Letters Patent is hereby corrected as shown below:

COLUMN 1

Line 34, "to" should be deleted.

COLUMN 2

Line 15, "data/hour" should read --date/hour--.
    Line 20, "tipe" should read --tip--.
    Line 46, "information." should read --information, wherein--.
    Line 60, "to" should read --so--.

COLUMN 3

Line 17, "appear" should read --show--.
    Line 22, "plurality" should read --plurality of--.
    Line 64, "can" should read --can be--.

COLUMN 6

Line 14, "from sent" should read --sent--.
    Line 62, "toward" should be deleted.

UNITED STATES PATENT AND TRADEMARK OFFICE
CERTIFICATE OF CORRECTION

PATENT NO. : 5,848,346

DATED : December 8, 1998

INVENTOR(S) : YUICHI TAKASHIRO

It is certified that error appears in the above-identified patent and that said Letters Patent is hereby corrected as shown below:

COLUMN 7

Line 3, "formed" should be deleted.
Line 21, "discharge tray," should read --discharged,--.
Line 33, "each" should read --each of the--.

COLUMN 8

Line 27, "to" should be deleted.
Line 40, "one ends" should read --the end--.
Line 43, "sheet" should read --sheets--.
Line 44, "upper-" should read --the upper- --.
Line 66, "Such a treatment is effected under region As the additional infor-" should be deleted.

COLUMN 9

Line 1, "mation A." should be deleted.
Line 3, "is" should be deleted.
Line 24, "identifying" should read --distinguishing--.

UNITED STATES PATENT AND TRADEMARK OFFICE
CERTIFICATE OF CORRECTION

PATENT NO.  : 5,848,346

DATED       : December 8, 1998

INVENTOR(S) : YUICHI TAKASHIRO

It is certified that error appears in the above-identified patent and that said Letters Patent is hereby corrected as shown below:

<u>COLUMN 10</u>

Line 24, "perpendicular" should read
   --perpendicularly to--.
Line 50, "or" should read --or an--.
Line 55, "mean" should read --means--.

Signed and Sealed this

Thirtieth Day of November, 1999

Attest:

Attesting Officer

Q. TODD DICKINSON

Acting Commissioner of Patents and Trademarks